June 22, 1937. H. BECKER 2,084,473
CAMERA FILM GUIDING MECHANISM
Filed Nov. 23, 1935
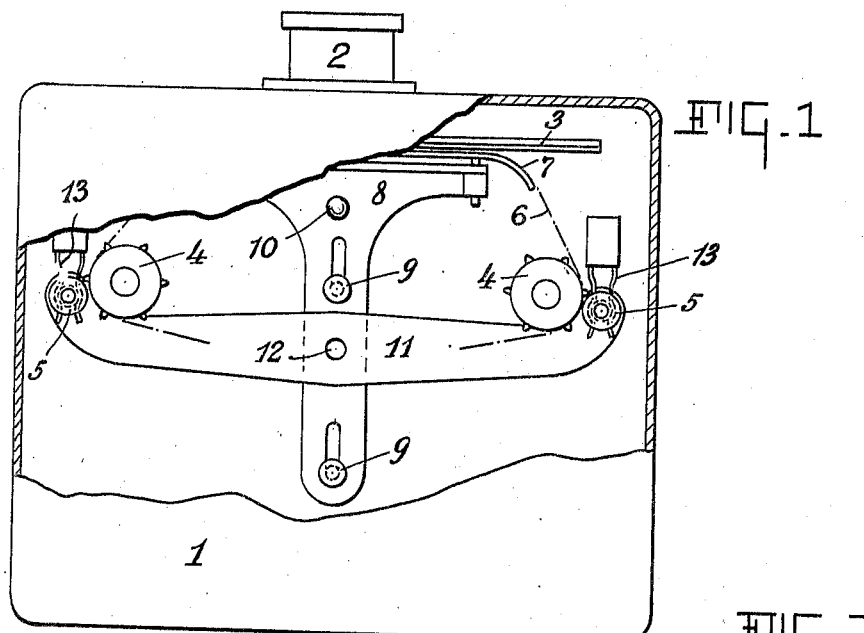
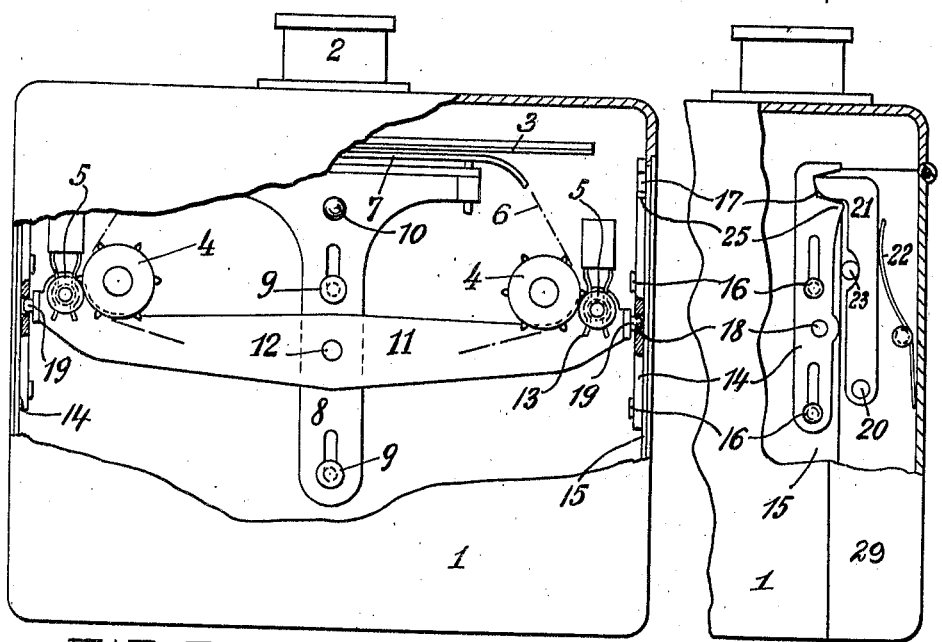

Patented June 22, 1937

2,084,473

UNITED STATES PATENT OFFICE 2,084,473

CAMERA FILM GUIDING MECHANISM

Helmut Becker, Wetzlar, Germany, assignor to Ernst Leitz, G. m. b. H., Wetzlar, Germany Application November 23, 1935, Serial No. 51,201 In Germany December 21, 1934

6 Claims. (Cl. 88—17)

This invention relates to motion picture cameras in which the film is operated past the objective by means of two film winding rollers and the film is maintained in operative contact with said rollers by means of film guide rolls. In order to thread the film through the camera, the film guide rolls are adapted to be moved away from and into contact with the winding rollers. A part of the film canal which guides the film past the objective is also movably supported. Motion picture cameras are being widely used by amateurs and it is therefore desirable that the mechanism of such cameras be made very simple in construction and that means be provided whereby the movable parts of the film guiding devices be arranged for automatic operation so as to require as little manipulation as possible on the part of the operator.

The object of the invention is therefore to provide an improved mechanism for operating the film guide rolls and other parts arranged so that these parts may be operated severally or all together, and preferably wholly automatic. Another object of the invention is to provide means whereby the said film guiding elements are automatically moved out of operative position when the camera is opened, and into operative position when the camera is closed. The automatic actuating means are so arranged that separate manual operation of the individual elements remains as a feature of the invention. In the drawing accompanying this specification Fig. 1 is a top view of a moving picture camera with parts in section and parts broken away.

Fig. 2 is a similar view including the mechanism operable by the opening and closing of the camera.

Fig. 3 is a detail view of parts shown in Figure 2.

Referring to the drawing, a camera 1 having an objective 2 and a fixed film guide 3 behind the objective is provided with two film winding rollers 4, 4. Two film guide rolls 5, 5 maintain the film 6 in operative connection with the rollers 4, 4. A movable film guide 7 cooperates with the guide 3 to regulate the passage of the film from one roller to another past the objective. The movable film guide 7 is carried by a slide 8 slidably supported on two headed pins 9, 9 and provided with a knob 10. A link 11 is pivoted to the slide at 12 and the guiding rolls 5 are supported in the ends of the link. The latter serves to move the guide rolls 5 into and out of engagement with the winding rollers. When in engagement with the latter, the guide rolls are held by spring clip supports 13, 13.

From this description and the drawing it will be seen that the operator may release the film by merely moving the slide 8 back from the objective in which event the film guide 3 moves away from the film and the two guide rolls are detached from their spring clip supports. The film may now be removed or it may be placed into position if the camera is not loaded. It will also be noted that the operator may release either one of the guide rolls 5 individually by moving one end of the link 11 backwards. This will also cause the slide 8 to be moved and the film will be released, there being sufficient slight play in the pivot 12 and around the pins 9 to permit of the release of the slide 8. However, it is immaterial whether one or both of the rolls 5 have been disengaged. When the slide 8 is pushed forward all film guiding elements are moved into engagement with their corresponding cooperative fixed elements.

It may happen that the operator forgets to move all the film guiding elements into operative position before closing the camera. This invention therefore has as one of its objects the provision of means for automatically moving all the movable film guiding elements into and out of operative positions automatically when the camera is closed or opened. Figures 2 and 3 illustrate this feature. The same reference numerals are used in these figures to indicate the parts which are identical with the same parts already described.

Referring to Figures 2 and 3 numerals 14, 14 denote slides which are supported on the sides 15 of the camera upon headed pins 16. Each slide has a recess 17 and a socket 18 for receiving a ball 19 whereby said slides are operatively connected to the ends of the link 11 as shown. To the cover 29 of the camera at each side there is pivoted at 20 a hook member 21 adapted to engage with the recesses 17 of the slides 14 as shown in Figure 3. A spring 22 keeps the hook member 21 in engagement with the slide and when the cover is open, the hook member rests upon a pin 23.

When the hinged cover is opened, the hook members 21 pull back the slides 14 and thereby also move the link 11 back whereby to disengage the winding rolls 5 and the movable film guide 7 from contact with the film. The action is wholly automatic. When the operator loads the camera he may forget to move the guide rolls and the film guide back into closed position. Or he may move only one of the rolls back. It will be seen however, that irrespective of the positions of these parts, when the cover is closed the hook members 21 engage the slides 14 and automatically move them forward and they in turn operate the link 11 with the rollers 4 and the guide 7 back into closed position.

If the operator has moved one of the rolls 5 into contact with its winding roller 4 so that its adjacent slide 14 is already in its forward position when the cover is closed, the hook member 21 on that side will simply ride on top of the slide and snap in over the point 25 thereof into the recess 17 against the pressure of the spring 22 in a manner easily understood from the drawing.

It will be seen therefore that this invention provides means for individual manual operation of the guide rolls 5 in and out of engagement with the winding rollers 4 and automatic operation of both of them as in Figure 1. Also that the film guiding means are released or closed automatically when the cover is opened or closed as in Figure 2, and in the latter case the rolls 5 may also be manually closed. The intention is of course that the operator shall operate the rolls 4 and guide 7 simply by opening and closing the cover of the camera.

I claim:

1. In a motion picture camera including film guide rolls and film winding rollers, a fixed and a movable film guide, spring clip supports holding said guide rolls in detachable operative engagement with the said winding rollers, a slide for supporting the movable film guide in operative relation to the fixed film guide, a link for supporting the said guide rolls and moving them into and out of engagement with the said holding supports and means for pivotally connecting the said slide and link for simultaneously and automatically moving said guide rolls and film guide as aforesaid.

2. In a motion picture camera in combination a fixed and a movable film guide, a pair of film winding rollers, a pair of film guide rolls, members detachably supporting the latter in operative engagement with the winding rollers, a slide for moving the movable film guide into and out of operative relation with the fixed guide, a link supporting said film guide rolls and means for pivotally connecting the said slide and the said link to afford simultaneous and automatic operation of the said film guide rolls and guide and whereby to afford individual operation of said guide rolls with respect to the supporting members therefor.

3. In a motion picture camera including a hinged cover in combination a fixed film guide, a movable film guide adapted to be moved into and out of operative relation with said fixed guide when the cover is opened, a pair of film winding rollers, a pair of film guide rolls adapted to be moved into and out of operative engagement with the winding rollers when the cover is opened and means automatically actuated by the closing of the said camera cover for moving the said film guide and winding rolls into their respective operative positions as aforesaid in the event any one or all of said members have been moved out of their said operative positions prior to the closing of the camera.

4. In a motion picture camera including a hinged cover, fixed film guiding and conveying members in said camera, movable film guiding devices adapted to cooperate with the said members to guide and convey the film, supporting members for said movable devices for moving the same separately or all together into and out of operative relation with the said fixed members when the cover is opened and mechanism operable from the said cover when the same is opened or closed for automatically moving all of said movable devices into and out of operative relation as aforesaid.

5. In a motion picture camera including a hinged cover, fixed film guiding and conveying members in said camera, movable film guiding devices adapted to cooperate with the said members to guide and convey the film, supporting members for said devices for moving the same into and out of operative relation with the said fixed members, a pair of slides in said camera, means for pivotally connecting one of said supporting members to the said slides and mechanism operable from the said cover when it is opened or closed for automatically actuating said slides to move all of said devices into and out of operative relation as aforesaid.

6. In a motion picture camera a hinged cover, film guiding and conveying members, manually operable supports for moving said members into and out of operative positions, slides in said camera connected to the supports, means on the cover for actuating said slides and supports to move said members as aforesaid when the cover is closed or opened, said means being adapted to engage said slides when the cover is closed irrespective of the positions of the said members.

HELMUT BECKER.